No. 719,702.                                                  PATENTED FEB. 3, 1903.
J. C. TAFT.
PRESS.
APPLICATION FILED SEPT. 25, 1900. RENEWED NOV. 4, 1902.
NO MODEL.
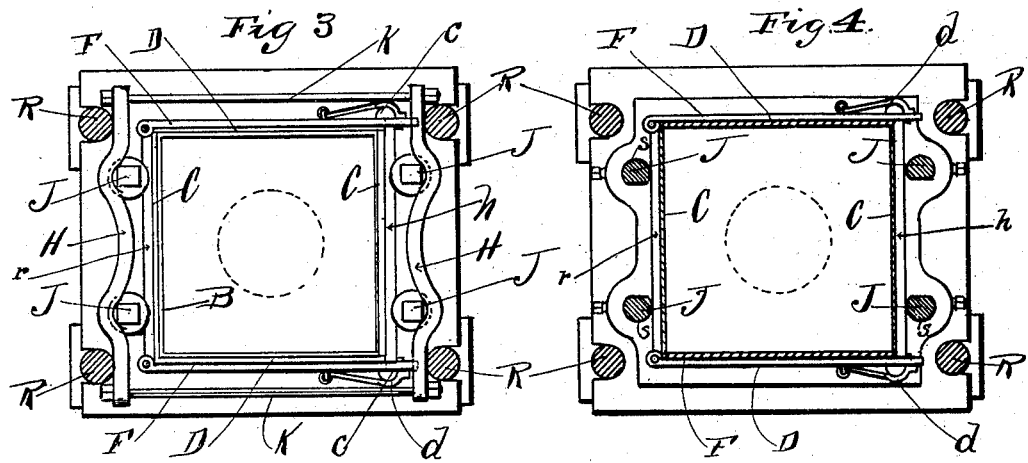
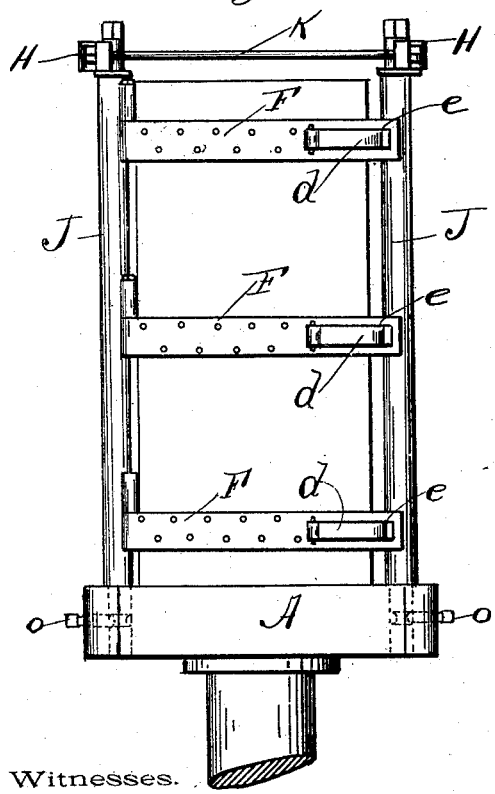
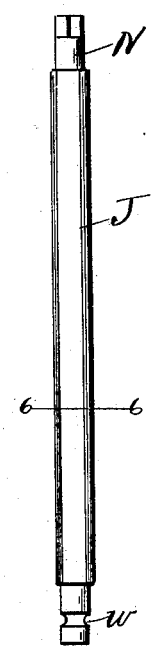
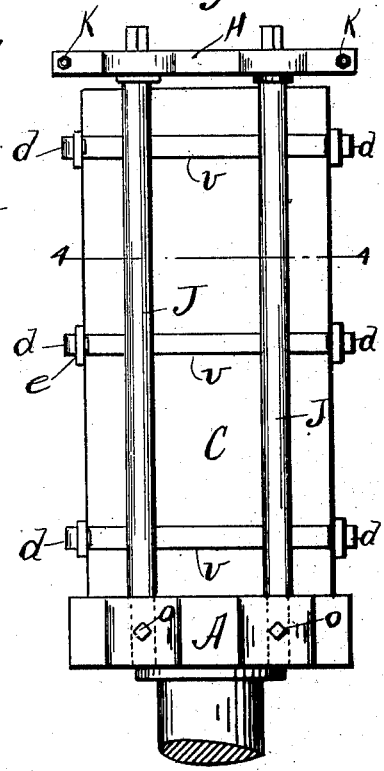
Witnesses.
Inventor.
Jerome C. Taft.
By Arnold & Barlow
Attorneys

UNITED STATES PATENT OFFICE.

JEROME C. TAFT, OF PROVIDENCE, RHODE ISLAND, ASSIGNOR TO THE AMERICAN COTTON BALE COMPANY, OF PROVIDENCE, RHODE ISLAND.

PRESS.

SPECIFICATION forming part of Letters Patent No. 719,702, dated February 3, 1903.

Application filed September 25, 1900. Renewed November 4, 1902. Serial No. 130,095. (No model.)

*To all whom it may concern:*

Be it known that I, JEROME C. TAFT, of Providence, in the county of Providence and State of Rhode Island, have invented certain new and useful Improvements in Presses; and I do hereby declare that the following is a full, clear, and exact description thereof, reference being had to the accompanying drawings, and to the letters of reference marked thereon, which form a part of this specification.

This invention relates to the class of presses used to compress cotton or other fibrous material, and has for its object to facilitate the removal of the case or bale when the process of compression is completed. It is fully explained and illustrated in this specification and the annexed drawings.

Figure 1 is a front elevation of the receptacle in which the material is pressed to form a bale or to hold a case for the purpose of having the material compressed in it. Fig. 2 is a side elevation of the receptacle intended to receive the compressed material. Fig. 3 is a top view of the receptacle. Fig. 4 is a horizontal section of the receptacle, taken on line 4 4 in Fig. 2. Fig. 5 shows one of the cam-bars separate. Fig. 6 shows a cross-section of one of the cam-bars on line 6 6, Fig. 5.

In heavy presses having a receptacle or outer shell used for baling cotton, bark, or other substances it is found that when the substance is pressed into a bale in the receptacle or into a shipping-case inclosed in the receptacle a difficulty is met with in removing the bale or case from the receptacle on account of its expansion against the sides of the receptacle caused by the heavy pressure applied in packing.

The object of this invention is to provide means for holding the sides of the receptacle while the case is being filled, so that they can be allowed to expand and the case or bale easily removed when pressed.

The construction is as follows: The receptacle in which the case B is held consists of two side plates C C, that are held on the platform A of the press, and a front and back door D D are attached by hinges F to the sides C of the receptacle, and the part of each hinge that is attached to the door extends a short distance beyond the door and has mortise $e$ made in it to receive a projection made on a bar $h$ on one of the plates C, the end of which bar is bent over to form a hook to enter the mortise and catch on the hinge-plate F at the back end of the mortise $e$, and a latch-hook $d$ is pivoted on the hinge-plate F, so that the end of it will enter the mortise $e$ between its outer end and the hook $c$ and keep the hooks from slipping off, which prevents the door from opening. Three of these hinges are shown for each door, but more can be used, if necessary. Four bars J J are made of round metal and flattened off on one side (see Fig. 6) between the bearings. At the upper end they are squared outside the bearings N to receive a wrench for the purpose of turning them. (See Fig. 5.) The bodies of the bars, which are flattened, are made the same length between the bearings as the height of the receptacle in which the case stands. These bars are placed two on each side outside the plates C C of the receptacle, and holes are made in the platform A to receive the lower bearings of the rods, and set-screws $o$ $o$ are put in the platform A, that enter grooves $w$ in the bars to hold them in, but which do not prevent them from turning. Two yoke-plates H H are placed one outside each pair of bars J to form journals for the bearings on the upper ends of the bars. These yoke-plates H are connected together at their ends by rods K K to hold them in place, but are principally supported by the main connecting-rods R R of the press to sustain the lateral pressure of the material in the receptacle. The operation is this: When the receptacle receives the case and is closed for filling, the rods J J are turned, so that the round portions $s$ (see Fig. 6) of the bars will bear against the hinge-plate $r$ on the outside of the plate C on one side and against the latch-bar $h$ on the outside the plate C on the other side of the receptacle. These cam-bars support the sides of the receptacle and prevent them from bulging, and when the case is filled and ready to be removed from the receptacle the doors D D are opened by releasing the latches, and the bars J J are turned by applying a wrench to their upper ends, so that the flat sides are turned toward the sides of the receptacle, which allows them to expand and release the case, so it can easily be taken out. If the material is compressed in the receptacle without the case to make a bale, the operation will be the same, as the straps or hoops inserted in the receptacle serve the same purpose as the case and hold the bale in shape, so that it can be easily taken out.

Having thus described my improvements, I claim as my invention and desire to secure by Letters Patent—

1. In a press, the combination of the receptacle having two sides and two doors, of upright cam bar or bars standing behind each side in bearings at each end to support them against the pressure and capable of being turned to release the sides of the receptacle, substantially as and for the purpose set forth.

2. In a press the combination with the receptacle, of the cam-bars having their lower ends journaled in the press-platform, the yoke-plates having bearings made in them to receive the upper ends of said cam-bars so as to be capable of being turned to release the sides of the receptacle and the rods connecting the ends of the yoke-plates, substantially as described.

3. In a press the combination of the receptacle having horizontal bars on its sides, cam-bars standing close to said receptacle and having one side reduced so as not to bear on said horizontal bars when turned toward them, yoke-plates having bearings made in them to receive the upper ends of the cam-bars and resting against the supporting-rods of the press, said supporting-rods, and rods connecting the ends of said yoke-plates, substantially as described.

4. In a press, the combination of a receptacle composed of two swinging doors and two expanding sides, cam-bars supporting said expanding sides, bars $h$ on one of said expanding sides, and latch-hooks $d$ on said expanding sides for locking said doors when closed, substantially as described.

In testimony whereof I have hereunto set my hand this 22d day of September, A. D. 1900.

JEROME C. TAFT.

In presence of—
BENJ. ARNOLD,
EDGAR S. MARSH.